UNITED STATES PATENT OFFICE 2,654,762

IODINATED SUBSTITUTED MERCAPTO-IMIDAZOLES

Charles F. Huebner, Morristown, and Caesar R. Scholz, Summit, N. J., assignors to Ciba Pharmaceutical Products, Incorporated, Summit, N. J., a corporation of New Jersey No Drawing. Application July 14, 1951, Serial No. 236,862

20 Claims. (Cl. 260—309)

This invention relates to iodinated substituted mercapto-imidazoles and to the preparation thereof.

A primary object of the invention is the embodiment of a group of substituted mercapto-imidazole derivatives which are useful, inter alia, as intermediates for the preparation of therapeutically active compounds such as anti-thyroid agents, and as X-ray contrast agents. This object is realized, according to the present invention, by the iodinated substituted mercapto-imidazoles which correspond to the formula

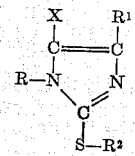

wherein $R^1$ stands for H, lower alkyl or I, X stands for H or I, at least one of $R^1$ and X being I, R stands for H or lower alkyl, and $R^2$ stands for alkyl, arylmethyl, or a radical derived from an α-halogen carboxylic acid.

A further object of the invention is the embodiment of methods for the preparation of the aforesaid iodinated substituted mercapto-imidazoles. This further object is realized, according to the invention, whereby iodinated substituted mercapto-imidazoles of the desired character can be prepared by benzylating and then iodinating the corresponding mercapto-imidazole in the presence of alkali to form, for example, the 2-benzylmercapto - 4,5 - diiodoimidazole. In like manner, the sulfhydryl group may be protected by other groups, for example by treating the mercapto-imidazole with an α-halogen carboxylic acid such as bromoacetic acid, chloroacetic acid, α-bromo-propionic acid and bromo-succinic acid, a lower dialkyl sulfate such as dimethyl sulfate, a lower diazo alkane such as diazomethane, or a naphthylmethyl halide, such as α-naphthylmethyl bromide, whereby the 2-carboxyalkylmercapto-imidazole or the corresponding alkylmercapto- or naphthylmethylmercapto-imidazole results.

To produce an N-alkylated iodinated mercapto-imidazole, the 2-benzylmercapto-4,5-diiodo-imidazole, for example, may be treated with a lower diazo alkane.

To produce the corresponding monoiodo derivative, the diiodo derivative—for example 4,5-diiodo - 2 - benzylmercapto-imidazole—may be treated with a molar equivalent of a metal sulfite in aqueous alkaline solution. Alternatively, 4-iodo-2-alkylmercapto-imidazole for example can be prepared from 4,5-diiodo-2-mercapto-imidazole by treating the latter with the metal sulfite followed by alkylation of the sulfhydryl radical.

Another type of mono-iodinated imidazole derivative may be prepared by the iodination of 4-alkyl-2-benzylmercapto-imidazoles, only one iodine being introduced into the molecule.

The various transformations according to this invention are carried out according to the following reaction scheme:

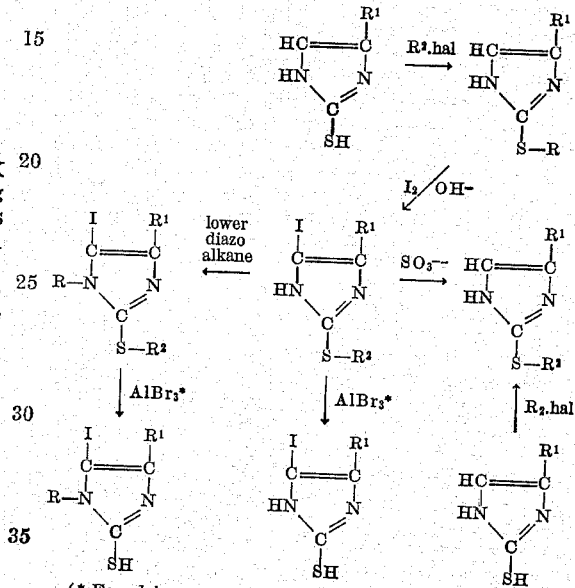

(* For debenzylation, when $R^2$=benzyl.)

wherein R, $R^1$ and $R^2$ have the previously indicated significances. When benzyl bromide, for instance, is the $R^2$.hal reactant, the product is the 2-benzylmercapto derivative. When a halogen carboxylic acid or an alkylating agent is the $R^2$.hal reactant, the product is the 2-carboxyalkylmercapto derivative, rather than the 2-benzylmercapto derivative. When, for instance, a naphthylmethyl chloride is employed, the product is the corresponding naphthylmethylmercapto derivative. When $R^1$ is hydrogen in the imidazole subjected to the iodination reaction, the resulting product is a 4,5-diiodo derivative and the character of the $R^1$ has thus been changed during the reaction.

In the foregoing processes, the reaction with the benzyl halide or naphthylmethyl halide is preferably carried out in a solvent such as methanol, ethanol, dioxane and the like, and proceeds rapidly at moderate temperature. With the halogen carboxylic acids and with dialkyl sulfate, the reaction proceeds in aqueous solution containing one equivalent of alkali.

Iodination proceeds rapidly at room temperature (20 to 30° C.) in a solvent mixture such as aqueous dioxane, aqueous methanol and the like, or, in the case of the mercaptocarboxylic acid derivatives, in water alone under alkaline conditions wherein the alkalinity is produced with an alkali metal hydroxide, such as sodium hydroxide potassium hydroxide.

The N-alkylation is advantageously carried out, particularly in the case of the 2-benzylmercapto-4,5-diiodo-imidazole, in a lower aliphatic alcohol (e. g. methanol, ethanol) or ketone (acetone), using a lower diazo alkane (e. g. diazomethane).

Debenzylation may be accomplished as described in copending application, Serial No. 236,861, filed July 14, 1951, e. g. by treating the 2-benzylmercapto derivative with anhydrous aluminum bromide at room temperature in a solvent such as benzene, carbon disulfide, carbon tetrachloride and the like. The reaction mixture is then worked up by slowly adding ice, while stirring, to destroy the aluminum complex and to precipitate the debenzylated imidazole. It may be further purified by solution in aqueous alkali followed by precipitation by addition of acetic acid.

The new compounds, when used as X-ray agents, are preferably administered parenterally.

The following examples set forth representative exemplary embodiments of the invention, and these examples are intended to be solely illustrative and not at all limitative. In these examples, the temperatures are given in degrees centigrade. Parts by weight bear the same relation to parts by volume as do grams to milliliters. Percentages are by weight. All melting points are uncorrected.

Example 1

58 parts by volume of benzyl bromide are added to a suspension of 49 parts by weight of 2-mercapto-imidazole in 300 parts by volume of ethanol. Immediate reaction is evident by a rapid rise in temperature of the mixture. After two hours, by which time the reaction mixture has cooled, an equal volume of ether is added to bring about complete precipitation of 2-benzylmercapto-imidazole hydrobromide which is filtered off. The latter is converted to the free base by dissolving in water and making the solution alkaline with an excess of ammonia. The free base is recrystallized from methanol; it melts at 145–146°.

15 parts by weight of the thus-prepared 2-benzylmercapto-imidazole are suspended in a mixture of 200 parts by volume of dioxane and a solution of 19 parts by weight of sodium hydroxide in 80 parts by volume of water. To the suspension, while stirring, is added a solution of 40 parts by weight of iodine and 40 parts by weight of potassium iodide in 100 parts by volume of water. The addition takes about ½ hour, and is carried out with external cooling in order to maintain a temperature of about 20–30°. After another half hour, most of the dioxane is removed by distillation in vacuo. The resulting reaction mixture is acidified with hydrochloric acid and the solid thoroughly triturated to insure complete decomposition of the sodium salt of the imidazole. The slight excess of iodine remaining is decolorized by the cautious addition of sodium bisulfite. The crystalline 2-benzylmercapto-4,5-diiodo-imidazole of the formula

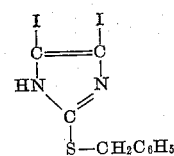

thus obtained is filtered and recrystallized from ethanol; it melts at 144–145°.

In the foregoing, the benzyl bromide may be replaced by an equivalent quantity of α-naphthylmethyl chloride or bromide whereupon, while otherwise proceeding as described, the corresponding α-naphthylmethyl derivative

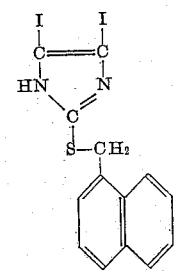

is obtained.

Example 2

2 parts by weight of 2-benzylmercapto-4,5-diiodo-imidazole are dissolved in 50 parts by volume of warm ethanol, quickly cooled and treated with an excess of etheral diazo-methane. After 2 hours, the solvent is removed by distillation and the residue recrystallized from ethanol; it melts at 73–74°. The product—2-benzylmercapto - 4,5 - diiodi-1-methyl - imidazole—corresponds to the formula

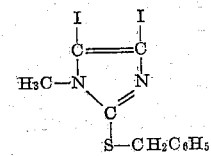

By using an equivalent quantity the α-naphthylmethyl derivative of Example 1 in lieu of the benzylmercapto-4,5-diiodo-imidazole, and otherwise proceeding as in the preceding paragraph, the corresponding α-naphthylmethyl derivative

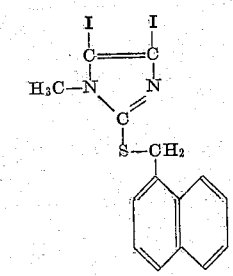

is obtained.

Example 3

5 parts by weight of 2-benzylmercapto-4,5-diiodo-imidazole are refluxed with 5 parts by weight of sodium bisulfite in 50 parts by volume of ethanol-water (5:1) for 12 hours. The solvent is distilled off and the crystalline residue filtered, washed with water and recrystallized from benzene-petroleum ether to yield 2-benzylmercapto-4(5)-iodo-imidazole, which melts at 107–110°. The product corresponds to the formula

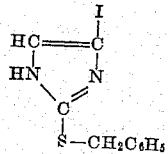

[The convention 4(5)- or 5(4)- is used in this specification to indicate that the designated substituent may be in either the 4- or 5-position. It will be noted, in this regard, that in the 2-mercapto-imidazoles which are unsubstituted in the 1- or 3-positions, the 4- and 5-positions are interchangeable. Thus, 2-benzylmercapto-4-iodo-imidazole can just as well be 2-benzylmercapto-5-iodo-imidazole.]

Example 4

10 parts by weight of 4,5-diiodo-2-mercapto-imidazole and 7.5 parts by weight of sodium sulfite heptahydrate are dissolved in 200 parts by volume of water containing 1.5 parts by weight of sodium hydroxide, and the solution heated to boiling under a reflux condenser. The refluxing is continued for 24 hours. After cooling and the addition of excess of acetic acid, 4(5)-iodo-2-mercapto-imidazole is obtained. The latter product is treated with benzyl bromide according to Example 1, whereupon 2-benzylmercapto-4(5)-iodo-imidazole, identical with the product of Example 3, is obtained.

Example 5

10 parts by weight of 4,5-diiodo-2-mercapto-1-methyl-imidazole and 7 parts by weight of sodium sulfite heptahydrate in 200 parts by volume of water containing 1.5 parts by weight of sodium hydroxide are refluxed for 12 hours. Addition of acetic acid precipitates monoiodo-2-mercapto-1-methyl-imidazole which is recrystallized from ethanol; it melts at 164° (darkening at decomposition). The latter is treated with benzyl bromide according to the procedure described in Example 1 to yield 2-benzylmercapto-monoiodo-1-methyl-imidazole.

[It will be understood that when 1-alkyl-imidazoles are prepared, the exact configuration of the substituents in the 4- and 5-positions, if these substituents are different, is not known so that it is not possible to assign an exact structure to such compounds. However, it is known that the monoiodo compound prepared by the present example corresponds to one of the formulae

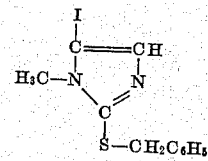

and

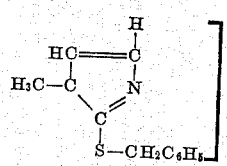

Example 6

15 parts by weight of 2-mercapto-imidazole, 21 parts by weight of bromoacetic acid, and 6 parts by weight of sodium hydroxide in solution in 150 parts by volume of water are heated for 15 minutes on the steam bath. Without cooling—which would permit the crystallization of the formed 2-imidazolyl-mercaptoacetic acid, melting at 110°—35.4 parts by weight of sodium hydroxide in 150 parts by weight of water are added and to the resulting solution, which is kept at 20–30° by external cooling, is added over one half hour a solution of 73 parts by weight of iodine and 73 parts by weight of potassium iodide in 180 parts by volume of water. After an additional half hour, addition of hydrochloric acid precipitates the crystalline (4,5-diiodo-2-imidazolyl)-mercaptoacetic acid of the formula

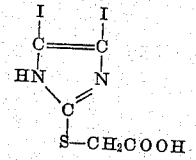

which may be recrystallized from ethanol-water; melting point 170° (with decomposition).

The same product can be prepared by the reaction of 4,5-diiodo-2-mercapto-imidazole with bromoacetic acid in the presence of two molar equivalents of sodium hydroxide as described above. The sodium salt of this acid is freely soluble in water and is of a pH (8.0) suitable for intravenous injection.

By replacing the bromoacetic acid by an equivalent quantity of chloroacetic acid, the same product may be obtained. If an equivalent quantity of α-bromopropionic acid is used, the product of the formula

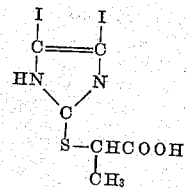

may be obtained, while if bromo-succinic acid is used, the corresponding S-substituted product may be obtained.

Example 7

10.5 parts by volume of benzyl bromide are added to a suspension of 10 parts by weight of 2-mercapto-4(5)-methyl-imidazole in 60 parts by volume of ethanol. After reaction as described in Example 1, the hydrobromide is obtained by precipitation with ether and the free base, 2-benzylmercapto-4(5)-methyl-imidazole is obtained after recrystallization from ethanol; melting point 105–106°.

15 parts by weight of the said 2-benzylmercapto-4(5)-methyl-imidazole are suspended in a mixture of 200 parts by volume of dioxane and a solution of 8.9 parts by weight of sodium hydroxide in 37 parts by volume of water. To the stirred suspension is added a solution of 18.6 parts by weight of iodine and 18.6 parts by weight of potassium iodide in 100 parts by volume of water. The addition is made gradually over a period of one-half hour while maintaining the temperature between 20° and 30°. After another half hour, the reaction mixture is worked up as described in Example 1. The formed crystalline 2-benzylmercapto-5(4)-methyl-imidazole, on recrystallization from ethanol, melts at 155–157°.

Example 8

8.4 parts by volume of benzyl bromide are added to a suspension of 10 parts by weight of 2-mercapto-4-propylimidazole in 60 parts by volume of ethanol. After reaction as described in Example 1, the hydrobromide is obtained by precipitation with ether. The non-crystalline free base is iodinated as described in Example 7, except that for 15 parts by weight of the formed 2-benzylmercapto-4-propyl-imidazole there are used 7.8 parts by weight of sodium hydroxide in 35 parts by volume of water and 16.4 parts by weight of iodine and 16.4 parts by weight of potassium iodide in 100 parts by volume of water. The iodinated product, 2-benzylmercapto-5-iodo-4-propyl-imidazole is isolated as described in Example 1; melting point 90–92°.

The product corresponds to the formula

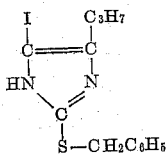

Having thus disclosed the invention, what is claimed is:

1. An iodinated substituted mercapto-imidazole which corresponds to the formula

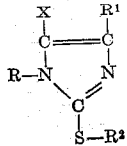

wherein R stands for a member selected from the group consisting of hydrogen and lower alkyl, $R^1$ stands for a member selected from the group consisting of hydrogen, lower alkyl and iodine, at least one of $R^1$ and X being iodine, and $R^2$ stands for a member selected from the group consisting of lower alkyl, mononuclear and binuclear carbocyclic arylmethyl radicals, and a radical derived from lower α-halogen carboxylic acid.

2. 2-benzylmercapto-monoiodo-imidazole.
3. 2-benzylmercapto-monoiodo-1-lower alkyl-imidazole.
4. 2-benzylmercapto-4,5-diiodo-1-lower alkyl-imidazole.
5. 2-benzylmercapto-5(4)-iodo-4(5)-lower alkyl-imidazole.
6. 2-benzylmercapto-4,5-diiodo-imidazole.
7. 2-benzylmercapto-4(5)-iodo-imidazole.
8. 2-benzylmercapto-4,5-diiodo-1-methyl-imidazole.
9. 2-benzylmercapto-5-iodo-4-methyl-imidazole.
10. (4,5-diiodo-2-imidazolyl)-mercaptoacetic acid.
11. A process for the production of an iodinated substituted mercapto-imidazole which includes the step of reacting a 2-mercapto-4-$R^1$-imidazole, wherein $R^1$ stands for a member selected from the group consisting of hydrogen, lower alkyl and iodine, with a member selected from the group consisting of mononuclear and binuclear carbocyclic arylmethyl halides, lower α-halogen carboxylic acids, lower dialkyl sulfates and lower diazo alkanes, the reaction being carried out in a neutral oxygenated polar solvent in the case of the arylmethyl halides and the lower diazo alkanes and in aqueous alkaline solution in the case of the lower α-halogen carboxylic acids and the lower dialkyl sulfates.

12. A process for the production of an iodinated substituted mercapto-imidazole which includes the step of reacting a 2-mercapto-4-$R^1$-imidazole, wherein $R^1$ stands for a member selected from the group consisting of hydrogen, lower alkyl and iodine, with benzyl bromide in a neutral oxygenated polar solvent, whereby the 2-benzyl-mercapto-4-$R^1$-imidazole is produced.

13. The process for the production of an iodinated substituted mercapto-imidazole which includes the step of reacting a 2-mercapto-4-$R^1$-imidazole, wherein $R^1$ stands for a member selected from the group consisting of hydrogen, lower alkyl and iodine, with a member selected from the group consisting of mononuclear and binuclear carbocyclic arylmethyl halides, lower α-halogen carboxylic acids, lower dialkyl sulfates and lower diazo alkanes, the reaction being carried out in a neutral oxygenated polar solvent in the case of the arylmethyl halides and the lower diazo alkanes and in aqueous alkaline solution in the case of the lower α-halogen carboxylic acids and the lower dialkyl sulfates, and reacting the product with iodine in a solvent containing alkaline OH ions.

14. A process for the production of an iodinated substituted mercapto-imidazole which includes the step of reacting a 2-mercapto-4-$R^1$-imidazole, wherein $R^1$ stands for a member selected from the group consisting of hydrogen, lower alkyl and iodine, with benzyl bromide in a neutral oxygenated polar solvent, whereby the 2-benzyl-mercapto-4-$R^1$-imidazole is produced, and reacting the product with iodine in a solvent containing alkaline OH ions.

15. A process for the production of 2-benzyl-mercapto-4,5-diiodo-imidazole which comprises reacting 2-mercapto-imidazole with benzyl bromide in a neutral oxygenated polar solvent, and reacting the resultant 2-benzylmercapto-imidazole with iodine in a solvent containing alkaline OH ions, whereby the 4,5-diiodo derivative results.

16. A process for the production of 2-benzyl-mercapto-monoiodo-imidazole which comprises reacting 2-mercapto-imidazole with benzyl bromide in a neutral oxygenated polar solvent, reacting the resultant 2-benzylmercapto-imidazole with iodine in a solvent containing alkaline OH ions, whereby the 2-benzylmercapto-4,5-diiodo-imidazole results, and de-iodinating the latter to the corresponding monoiodo compound with the aid of a metal sulfite.

17. A process for the production of (4,5-diiodo-2-imidazolyl)-mercaptoacetic acid which comprises reacting 4,5-diiodo-2-mercapto-imidazole with bromoacetic acid in aqueous alkaline solution.

18. A process for the production of (4,5-diiodo-2-imidazolyl)-mercaptoacetic acid which comprises reacting 2-mercapto-imidazole with bromoacetic acid in aqueous alkaline solution, and then iodinating the resultant 2-imidazolyl-mercaptoacetic acid by reacting it with iodine in a solvent containing alkaline OH ions.

19. A process for the production of 2-benzyl-mercapto-5-iodo-4-methyl-imidazole which comprises reacting 1-mercapto-4-methyl-imidazole with benzyl bromide in a neutral oxygenated polar solvent, and then iodinating the resultant 2-benzylmercapto-4-methyl-imidazole by reacting it with iodine in a solvent containing alkaline OH ions.

20. A process for the production of 2-benzyl-mercapto-5-iodo-4-propyl imidazole which comprises reacting 1-mercapto-4-propyl-imidazole with benzyl bromide in a neutral oxygenated polar solvent, and then iodinating the resultant 2-benzylmercapto-4-propyl-imidazole by reacting it with iodine in a solvent containing alkaline OH ions.

CHARLES F. HUEBNER.
CAESAR R. SCHOLZ.

References Cited in the file of this patent

Pauley: Ber-Deut. Chem. 43, pp. 2243–2261 (1910).

Pauley et al.: J. Prokt. Chem. 118, pp. 33–47 (1928).

Astwood et al.: "Endocrinology," vol. 37, 1945, pp. 456–481.

Stanley et al.: "Endocrinology," vol. 44 (1949), page 588.

Stanley et al.: "Endocrinology," vol. 41 (1947), pp. 66–84.